United States Patent [19]

Newhouse

[11] Patent Number: 4,990,810
[45] Date of Patent: Feb. 5, 1991

[54] COIL CARRIER FIXTURE AND FIELD COIL CARRIER ASSEMBLY

[75] Inventor: Brian L. Newhouse, Apollo, Pa.

[73] Assignee: Westinghouse Electric Corp., Pittsburgh, Pa.

[21] Appl. No.: 381,352

[22] Filed: Jul. 18, 1989

[51] Int. Cl.[5] .......................... H02K 1/22; H02K 3/46; H02K 3/00
[52] U.S. Cl. ..................... 310/194; 310/179; 310/218; 310/180
[58] Field of Search ................. 310/45, 179, 180, 184, 310/185, 194, 195, 208, 215, 216, 218, 269

[56] References Cited

U.S. PATENT DOCUMENTS

| | | |
|---|---|---|
| 571,462 | 11/1896 | Thompson et al. |
| 756,954 | 4/1904 | Geisenhoner ..................... 310/194 |
| 764,481 | 7/1904 | Litchfield ........................ 310/194 |
| 823,566 | 6/1906 | Waters ............................. 310/194 |
| 941,456 | 11/1909 | Howell ............................ 310/218 |
| 1,502,527 | 7/1924 | Reichel et al. |
| 2,655,613 | 10/1953 | Wieseman ........................ 310/194 |
| 3,219,348 | 4/1964 | Simmons ......................... 310/194 |
| 3,728,566 | 4/1973 | Costello .......................... 310/194 |
| 4,074,161 | 2/1978 | Minichev et al. ................. 310/194 |

FOREIGN PATENT DOCUMENTS 458381 12/1936 United Kingdom ................ 310/269

Primary Examiner—Steven L. Stephan
Assistant Examiner—C. LaBalle

[57] ABSTRACT

A metal coil carrier fixture for mounting an annular field coil has a base and a lid separate from the base. The base has an upstanding tubular wall, a lower annular flange connected to, extending about and projecting outwardly from the tubular wall, and an upper wall disposed within and extending across the tubular wall and connected to an upper edge thereof. The lid has an inner central portion disposed in a substantially flush engaging relation with the upper wall of the base and detachably attached thereto, and an outer annular portion defining an upper annular flange extending about and projecting outwardly from the tubular base wall and spaced above the lower annular flange thereof when the lid is attached on the base. The tubular wall and lower annular flange of the base and the upper annular flange of the lid define an external cavity in which the annular field coil can be confined about the exterior of the tubular base wall and between the lower and upper annular flanges of the respective base and lid and into the from which the field coil can be inserted and removed by detachment of the lid from the base.

16 Claims, 5 Drawing Sheets

COIL CARRIER FIXTURE AND FIELD COIL CARRIER ASSEMBLY

The invention described herein was made in the course of work performed under Contract No. N-00024-83-C-4181 awarded by the United States Government.

CROSS REFERENCE TO RELATED APPLICATIONS

Reference is hereby made to the following copending patent applications dealing with related subject matter and assigned to the assignee of the present invention:
1. "Water-Cooled AC and DC Motor-Generator Set On A Common Shaft With Series Cooling Flow Path" by Brian L. Newhouse, assigned U. S. Ser. No. 026,250 and filed Mar.16, 1987(W.E. 53,456).
2. "Internally-Located Rotating Union For A Motor-Generator Set" by Brian L. Newhouse, assigned U. S. Ser. No. 042,184 and filed Apr. 24, 1987 (W.E. 53,613).
3. "AC And DC Motor-Generator Set With Ferromagnetic Spiders Shrunk Fit On Water-Cooled Low-Ferromagnetic Rotor Shaft" by Brian L. Newhouse et al, assigned U.S. Ser. No. 149,240 and filed Jan. 27, 1988 (W.E. 54,163).

BACKGROUND OF THE INVENTION

1. Field of the Invention

The present invention relates generally to dynamoelectric machines, and, more particularly, is concerned with a coil carrier fixture for mounting a field coil to a rotor of a dynamoelectric machine, such as an AC and DC motor-generator set, and a method of fabricating a field coil carrier assembly.

2. Description of the Prior Art

A secondary power source in the form of a dynamoelectric machine is typically provided in a nuclear submarine to generate reserve power. A nuclear power plant provided in the submarine is the primary power source to power the submarine. It also powers the secondary power source to charge DC batteries. Then, during periods when the nuclear power plant is shut down or knocked off-line, the reserve power of the DC batteries is used to restart the primary source to operate the submarine.

One typical secondary power source used heretofore employs a dynamoelectric machine in the form of an AC and DC motor-generator set in which the AC and DC components are disposed in tandem arrangement on and along a common solid shaft. During periods of nuclear power plant operation, the AC component functions as a motor to rotatably drive the common shaft and thereby run the DC component as a generator to charge the DC batteries. Then, during periods when the nuclear power plant is shut down, the DC batteries operate the DC component as a motor to rotatably drive the common shaft and thereby run the AC component as a generator to operate the submarine.

The AC and DC motor-generator set typically includes AC and DC rotors supported in tandem relationship along a central shaft for rotation therewith. The AC and DC rotors include respective pole body spiders and pole heads fastened on circumferentially spaced outer projections of the pole body spiders. Also, field coils are installed about the spaced projections of the rotor pole body spiders.

The conventional method for mounting a field coil to the rotor is to first wind each coil on a mandrel, next varnish the coil, and then wrap the entire coil with insulation tape. The insulated coils are then slipped onto the projections of the pole body spider of the rotor. Finally, the entire rotor (with coils mounted) is varnished by dipping to ensure a firm fixed fit of the coils to the rotor pole body. The inherent problem with this mounting method is the difficulty of removing and servicing an individual coil once it is varnish glued to the rotor. Also, once the coil is replaced the entire rotor has to be lifted and dipped in varnish to secure the newly added coil.

An alternate method for mounting field coils to the rotor is to wind the individual coils directly on the projections of the rotor pole body spider or on a metal one-piece annular bobbin. This method requires great care to ensure a proper insulation layer on the outer geometry of the pole body/bobbin winding surface to prevent electrical shorting of the coil.

Resin-based, as opposed to metal, bobbins exist which provide an insulated winding surface without the difficulty of having to develop and ensure the integrity of an applied insulation process. However, fabrication of a resin-based bobbin requires relatively expensive mold tooling which is: considered excessive for only low production quantities.

In addition, using a bobbin to mount the field coil to the rotor pole body is tedious and time-consuming. It generally requires extensive custom shimming of the bobbin to provide a satisfactory tight fit of the bobbin to the rotor that is long-lasting and will eliminate the possibility of the field coil rocking during machine operation. Furthermore, a field coil which is tightly shimmed to the rotor to prevent rocking will ordinarily result in a mounted field coil which is difficult to remove for retrofit.

Consequently, a need still exists for another approach to mounting individual field coils to the rotors of a dynamoelectric machine, such as an AC and DC motor-generator set, so as to avoid the above-described drawbacks of the prior methods.

SUMMARY OF THE INVENTION

The present invention provides features designed to satisfy the aforementioned needs. The features of the present invention encompass a coil carrier fixture for mounting a field coil to the rotor pole body without the need to shim the coil or carrier, and a method of fabricating a field coil carrier assembly that is easily installed on the rotor and easily removed for service or replacement. The need to varnish glue the field coils and rotor together is eliminated. Thus, there is no longer a need to lift and dip the entire rotor.

Accordingly, the present invention is directed to a coil carrier fixture for mounting an annular field coil. The fixture comprises: (a) a base; and (b) a lid separate from the base. The base has an upstanding tubular wall, a lower annular flange connected to, extending about and projecting outwardly from the tubular wall, and an upper wall disposed within and extending across the tubular wall and connected to an upper edge thereof. The lid has an inner central portion disposable in substantially flush engaging relation with the upper wall of the base and detachably attached thereto, and an outer annular portion defining an upper annular flange extending about and projecting outwardly from the tubular wall of the base and spaced above the lower annular flange thereof when the lid is attached on the base. The tubular wall and lower annular flange of the base and the upper annular flange of the lid define an external cavity in which the annular field coil can be confined about the exterior of the tubular base wall and between the lower and upper annular flanges of the respective base and lid and into and from which the field coil can be inserted and removed by detachment of the lid from the base.

Also, the present invention is directed to a field coil carrier assembly which comprises an annular wire wound electrical field coil, and the above-described coil carrier fixture. A resin material impregnates the field coil and the carrier fixture so as to secure the field coil to the fixture.

Further, the present invention is directed to a method of fabricating a field coil carrier assembly which comprises the steps of: (a) forming a wire wound field coil; and (b) mounting the wound field coil within an annular cavity defined between upper and lower annular flanges on a coil carrier fixture and about the exterior of a tubular base thereof extending between the flanges. The field coil is formed by winding the coil from wires on a mandrel and then removing the wound coil from the mandrel. After removal of the wound field coil, the coil is then wrapped with insulating material. After mounting of the coil on the carrier fixture, the field coil and fixture are together impregnated with a resin material for securing the coil to the fixture.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
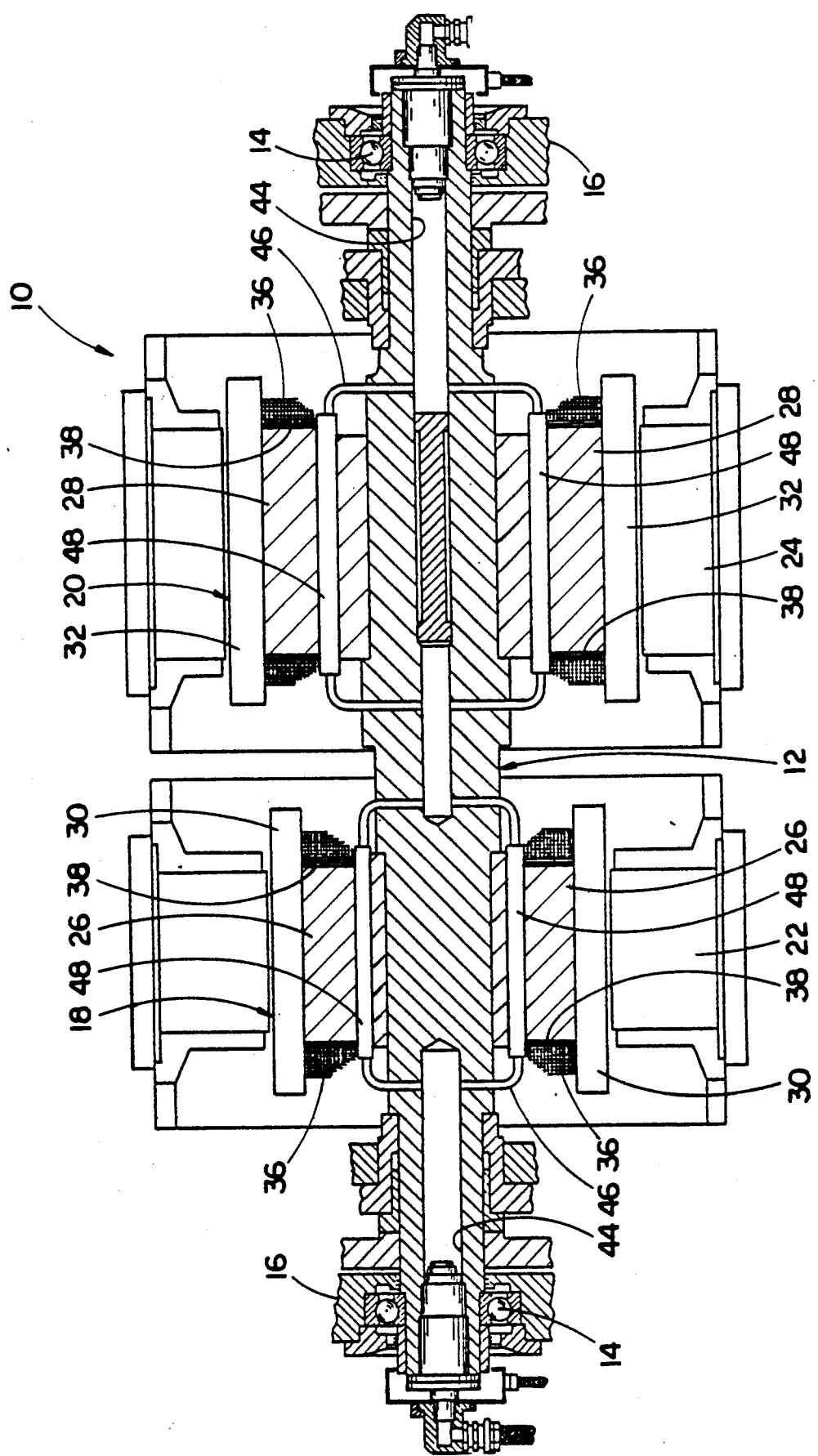
FIG. 1 is a longitudinal axial sectional view of a dynamoelectric machine, such as a prior art AC and DC motor-generator set to which can be applied the principles of the present invention.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

PRIOR ART MOTOR-GENERATOR SET

Figure 2:
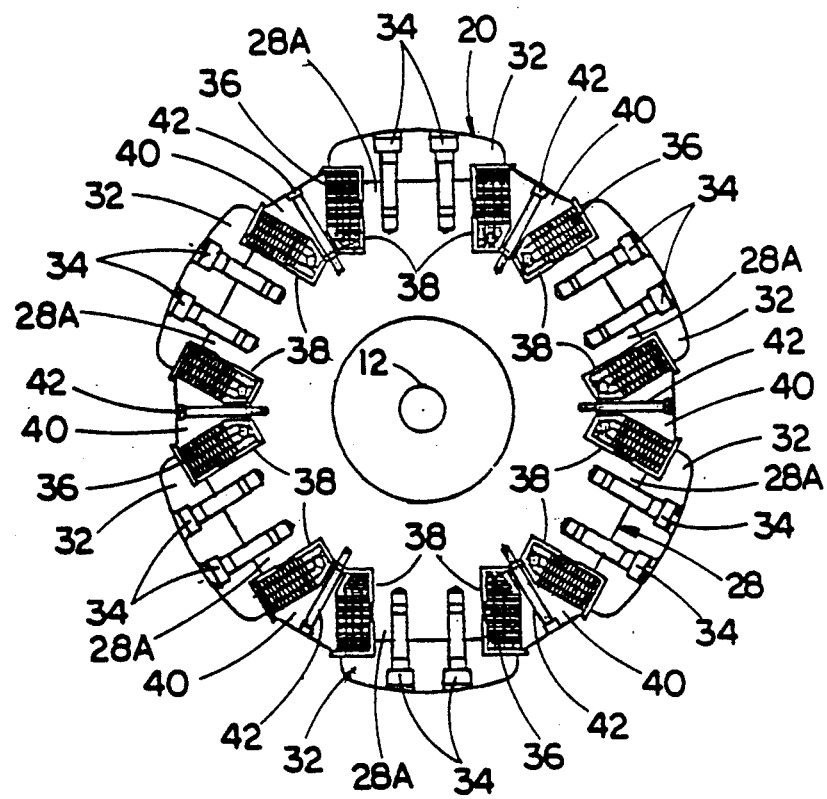
FIG. 2 is a cross-sectional view of the DC side rotor and shaft of the prior art motor-generator set of FIG. 1.
Figure 3:
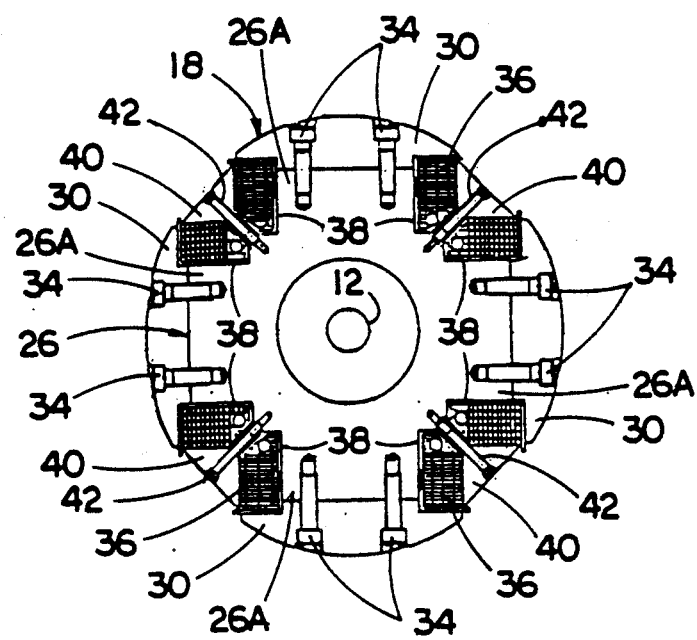
FIG. 3 is a cross-sectional view of the AC side rotor and shaft of the prior art motor-generator set of FIG. 1.

Referring now to the drawings, and particularly to FIGS. 1-3, there is shown a prior art motor-generator set, generally designated by the numeral 10. Basically, the prior art motor-generator set 10 includes a generally cylindrical central shaft 12 extending through a sealed housing (not shown) and being rotatably mounted at its opposite ends by bearings 14 which, in turn, are supported by end portions 16 of the housing. The set 10 also includes annular-shaped AC and DC rotors 18, 20 supported in tandem relationship along the central shaft 12 for rotation therewith, and annular-shaped stator cores 22, 24 which encompass the respective rotors 18, 20 in closely spaced relationship thereto.

More particularly, as best seen in FIGS. 2 and 3, the rotors 18, 20 include respective individual pole body spiders 26, 28 and pole heads 30, 32. The pole body spiders 26, 28 are of solid steel construction and the pole heads 30, 32 are connected by threaded fasteners 34 to circumferentially-spaced radial projections 26A, 28A of the pole body spiders 26, 28. The AC rotor pole body spider 26 has four such projections 26A thereon being angularly displaced from one another by ninety degrees, whereas the DC rotor pole body spider 28 has six such projections 28A thereon being angularly displaced from one another by sixty degrees. Also, individual electrical field coils 36 are wound about bobbins 38 and the assembly of the two installed about the outer projections 26A, 28A of the pole body spiders 26, 28 of the AC and DC rotors 18, 20. Further, wedges 40 and capscrews 42 are attached to the pole body spiders 26, 28 for maintaining the integrity of the field coils 36.

Also, the motor-generator set 10 includes a field coil cooling system providing flow of liquid coolant in a series relationship through the central shaft 12 and the rotors 18, 20. The cooling system is composed of bores 44 formed in the shaft 12 and radial and axial conduits 46, 48 leading from and to the shaft bores 44 and from and to the respective field coils 36 supported on the bobbins 38 about the projections 26A, 28A of the rotor pole body spiders 26, 28.

Figure 4:
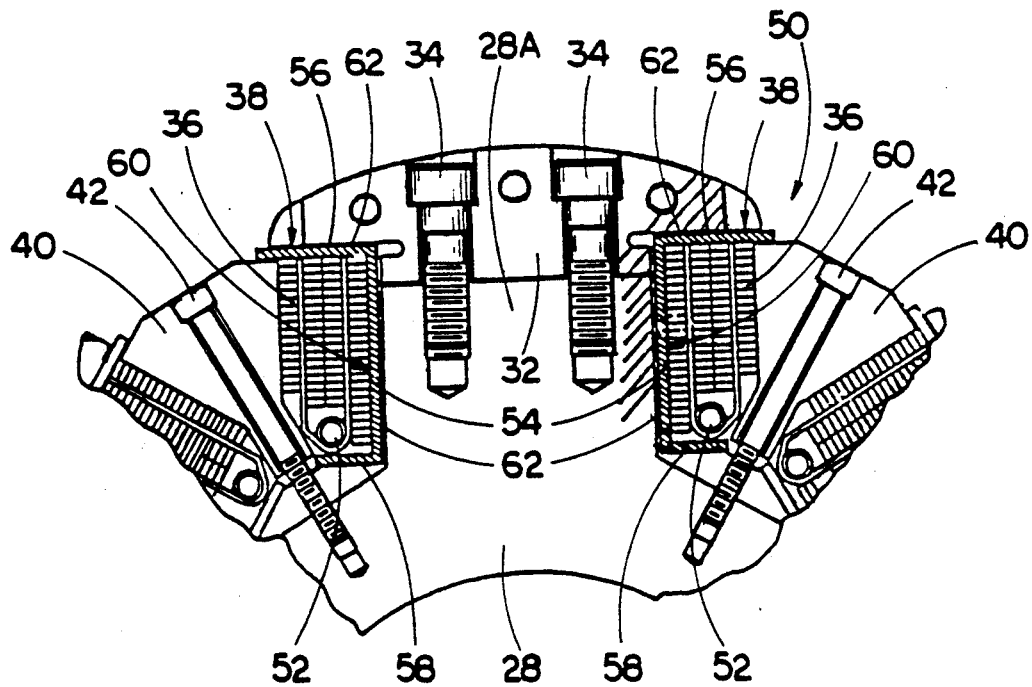
FIG. 4 is an enlarged fragmentary view of the DC side rotor of FIG. 3, showing a bobbin and field coil mounted thereto.

Referring now to FIG. 4, there is illustrated a prior art assembly, generally designated 50, composed of the metal bobbin 38 and the field coil 36 wound thereon. The assembly 50 is the means by which each field coil 36 is mounted to the rotors 26, 28. The field coil 36 has a finned-cooling tube 52 interwound therewith. The bobbin 38 is of a fiber composition, being mold injected and of one piece construction, and has an upstanding tubular wall 54 open at its opposite ends and a pair of upper and lower annular flanges 56, 58 connected to the tubular wall 54 at its upper and lower ends and projecting outwardly therefrom. Between the upper and lower flanges 56, 58 and about the exterior of the tubular wall 54 is defined an annular cavity 60 in which is wound and housed the field coil 36.

To install the field coil 36, for example, on the DC side rotor 28 shown in FIG. 4, the bobbin 38 with the field coil 36 mounted thereon is slipped over the outer projection 28A of the pole body spider 28, and the pole head 32 is installed on the outer projection 28A and fastened thereon by threaded fasteners 34. Then, to "fit-up" or tightly secure the field coil and bobbin assembly 50 to the pole rotor spider projection 28A, shims 62 are inserted between the tubular wall 54 and upper flange 56 of the bobbin 38 and the confronting surfaces of the pole body spider 28 and pole head 32. The disadvantages of this method of mounting the field coil 36 to the rotor pole body spider 28 have been pointed out in the background section supra.

COIL CARRIER FIXTURE FOR SUPPORTING FIELD COIL

Turning now to FIGS. 5-10, there is illustrated a field coil carrier assembly, generally designated 64, which in accordance with the principles of the present invention incorporates a coil carrier fixture 66 used in place of the prior art bobbin 38 of FIG. 4. The field coil carrier assembly 64 includes the same annular wire wound electrical field coil 36 as used in the prior art assembly 50. However, instead of the bobbin 38, the assembly 64 employs the coil carrier fixture 66. As discussed earlier, the carrier fixture 66 mounts the field coil 36 to the rotor pole body 26, 28 so as to eliminate the need &:o shim the coil or carrier to the rotor and the need to dip the entire rotor 26, 28 for varnish gluing or resin impregnating the coil to secure it to the rotor.

Figure 5:
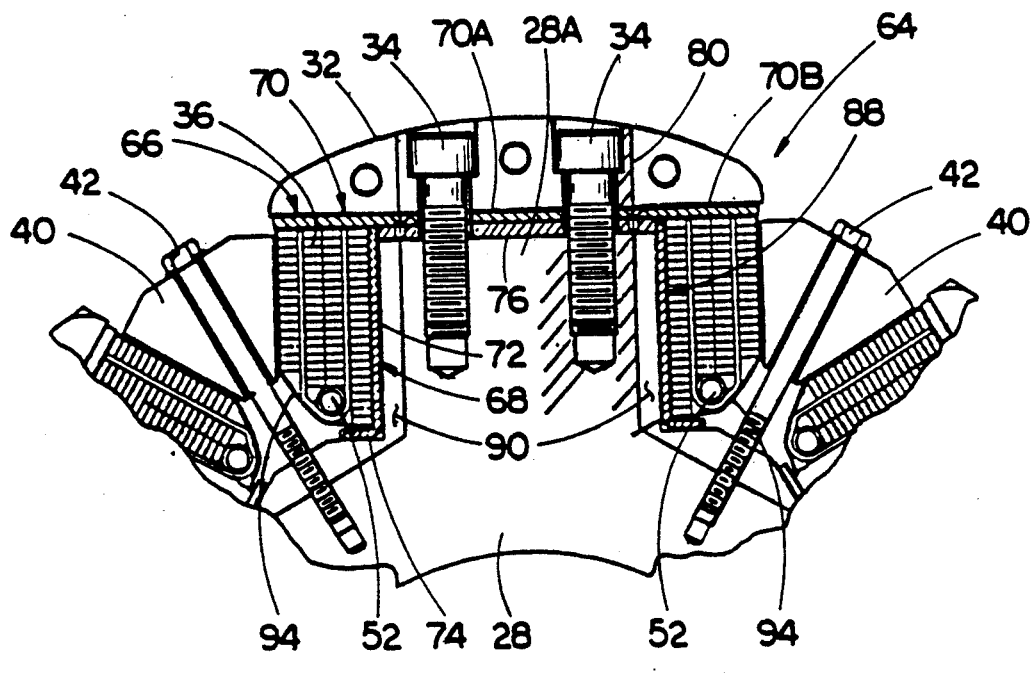
FIG. 5 is a view similar to that of FIG. 4, but illustrating a coil carrier fixture of the present invention assembled with a field coil and sandwiched between a pole head and pole body spider of the DC side rotor.

In its basic components, the carrier fixture 66 of the field coil carrier assembly 64 includes a base 68 and a flat plate-like lid 70 separate from the base. The base 68 of the fixture 66 has an upstanding tubular wall 72, a lower annular flange 74 and an upper end wall 76. The tubular wall 72 of the base 68 is hollow and continuous and has opposite upper and lower open ends. The lower annular flange 74 of the base 68 is connected to the lower end of the tubular wall 72 and extends about and projects outwardly from the lower edge thereof. The upper end wall 76 of the base 68 is a flat plate disposed within and extending across the tubular wall 72. The upper end wall 76 is connected to the upper edge of the tubular wall 72 so as to substantially close its upper open end. The upper end wall 76 is spaced at its opposite ends from the corresponding sides of the tubular wall 72 so as to define slots 78 which allow passage of copper end plates 80 on the pole body spider 28. The above-described disposition of the upper end wall 76 within the tubular wall 72 permits insertion of the annular field coil 36 downwardly past the upper end wall 76 and over the exterior of the tubular wall 72 into a mounted position, as seen in FIG. 5, wherein the field coil 36 surrounds the exterior surface 72A of the tubular wall 72 and rests upon the lower annular flange 74.

Figure 6:
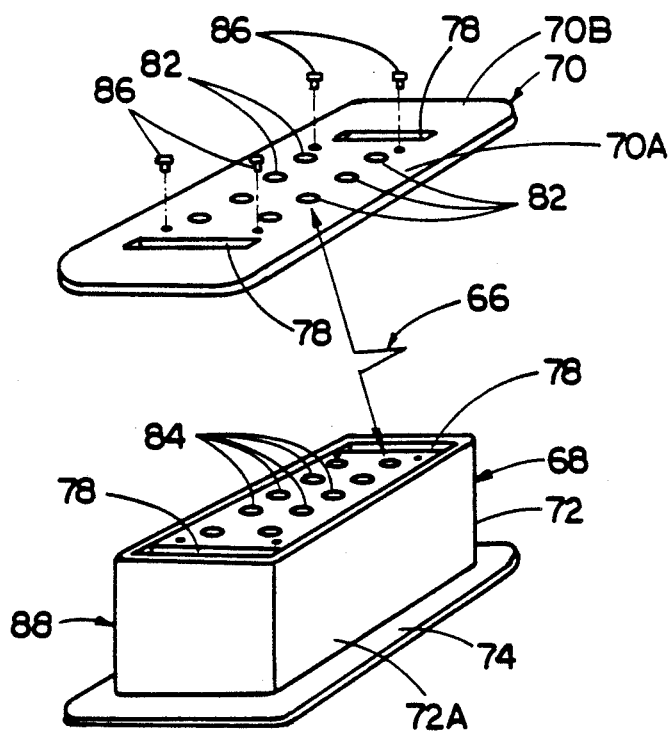
FIG. 6 is an exploded perspective view of the coil carrier fixture of the present invention.

The lid 70 of the fixture 66 has an inner central portion 70A disposable in a substantially flush engaging relation with the upper end wall 76 of the base 68 when the base and lid are assembled together. The inner central portion 70A has a plurality of holes 82 defined therethrough in a pattern which matches that of a plurality of holes 84 in the base upper end wall 76. The larger holes permit insertion of the fasteners 34 therethrough to fasten the pole head 32 to the pole body spider 28 and clamp or sandwich the lid 70 and upper end wall 76 of the base 68 therebetween, as shown in FIG. 5. The smaller holes receive a plurality of fasteners 86, as seen in FIG. 6 and 10, for detachably attaching the lid 70 to the base upper end wall 76.

The lid 70 of the fixture 66 also has an outer peripheral portion 70B defining an upper annular flange which, when the lid 70 is attached on the base 68, extends about and projects outwardly from the tubular wall 72 of the base 68 at the upper edge thereof. The upper annular flange 70B of the lid 70 is thus spaced above the lower annular flange 74 of the base 68. The tubular wall 72 and lower annular flange 74 of the base 68 and the upper annular flange 70B of the lid 70 together define an external cavity 88. The annular field coil 36 is encased or confined within the cavity, 88 about the exterior of the &tubular base wall 72 and between the lower and upper annular flanges 74, 70B of the respective base 68 and lid 70. The assembled field coil 36 and carrier fixture 66 are impregnated together with a resin material to secure the field coil thereto.

The coil carrier fixture 66 is therefore a two-piece unit which permits installation of the field coil 36 thereon to form the field coil carrier assembly 50. The assembly 50 can be inventoried as a replacement part. Its modular construction does not require great effort for its removal from the rotor and replacement by a new assembly. Also, the presence of the lower annular flange 74 helps to protect the field coil 36 of the assembly 64 from damage before installation and to prevent sagging of the coil 36 after installation of the assembly. Preferably, the upper end base wall 76 and the lid 70 which cut across the flux field between the pole head 30, 32 and pole body spider 26, 28 are composed of the same electrically conductive material so that the magnetic flux path is not disrupted by the presence of these fixture components sandwiched between the pole head and spider. Also, the construction of the carrier fixture 66 permits the tubular base wall 72 to be supported, as seen in FIG. 5, in outwardly spaced surrounding relation about the pole body spider outer projection 26A, 28A so as to define an air gap 90 therebetween.

Figure 7:
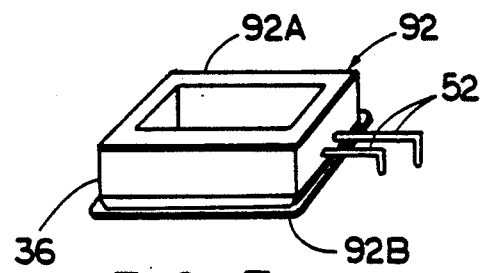
FIGS. 7-9 are a series of views illustrating the sequence of steps in fabricating the field coil supported by the coil carrier fixture of the present invention.
Figure 8:
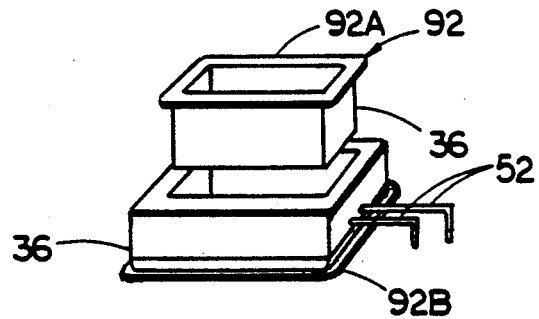
Figure 9:
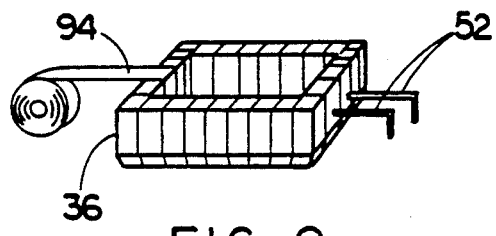
Figure 10:
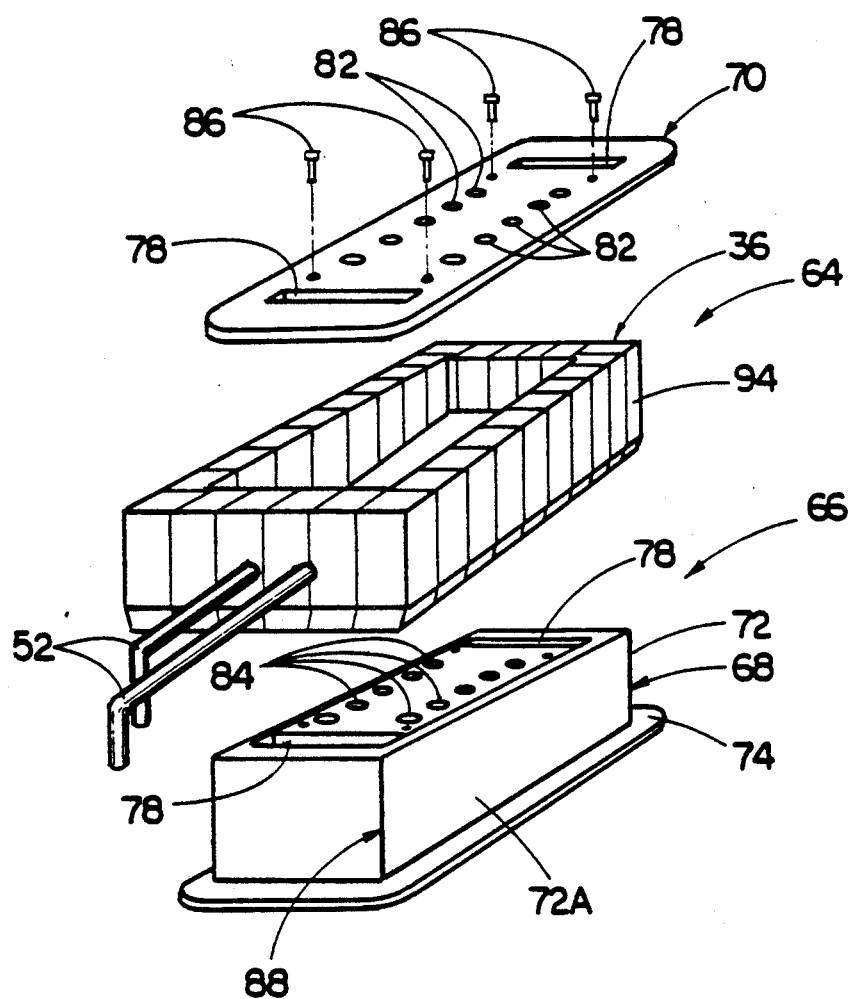
FIG. 10 is an exploded perspective view of the field coil carrier assembly of the present invention.

Referring to FIGS. 7-10, there is illustrated the steps of fabricating the field coil carrier assembly 64. FIGS. 7-9 depict the forming of the wire wound field coil 36. FIG. 10 depicts the wound field coil 36 being placed within the annular cavity 88 defined between upper and lower annular flanges 70B, 74 on the coil carrier fixture 66 and about the exterior of tubular base wall 72 extending between the flanges.

More particularly, in FIG. 7, a two-piece mandrel 92 is used to form the field coil 36. The field coil 36 is formed by winding wires on closed mandrel 92 and then by removing the wound coil 36 from the mandrel 92 by separating its upper and lower halves 92A, 92B. The finned-cooling tube 52 is interwound with the coil. After removal of the wound field coil 36, the coil is then wrapped with insulating material 94, such as mica tape. Even through the individual wires of the coil 36 are insulated, the application of the insulating tape 94 gives extra protection against inadvertent insulation breaks. After mounting of the coil 36 on the carrier fixture 66, the assembled field coil 36 and fixture 66 are together impregnated with the resin material for securing the coil to the fixture.

In summary, the features of the present invention employed in the motor-generator set 10 have the following significant advantages:

(1) The field coil carrier fixture 66 is a twopiece, bolted-together design which provides top and bottom metal flanges that ensure that the windings of the field coil 36 do not have to rely on the impregnated resin to vertically fix the coil at any time. Both pieces (lid 70 and base 68) of the fixture 66 are sandwiched between the pole head 32 and pole body 28 which creates a solid cavity to house the impregnated coil and totally eliminate any need to shim for a firm "fit-up" of the coil.

(2) The portions of the carrier fixture 66 which become a part of the flux path of the pole have been shaped and clamped together in a manner which results in a minimal air gap and thus avoids disruption of the pole flux path.

(3) The carrier fixture 66 also provides a structure to which the coil can be rigidly mounted via impregnation and thus eliminates having to impregnate the entire rotor assembly to secure the coils firmly on the rotor during initial assembly and after service or replacement. Dipping individual field coil carrier assemblies 64 is also more cost efficient than dipping the entire rotor assembly.

(4) Eliminating the need for impregnation of the entire rotor assembly to secure the field coils by using an impregnated coil carrier fixture 66 greatly improves the ability to remove the pole head and promotes shipboard field coil removal and replacement.

(5) The coil carrier fixture 66 is made of metal which avoids the relatively high upfront tooling cost associated with injection molding a resin-based support fixture.

(6) Relying primarily on its sandwiched portions, the coil carrier fixture 66 provides an air gap 90 all around the pole body wall which creates an additional thermal barrier that promotes removal of coil generated heat by the fin-tube cooling arrangement.

(7) The provision of slots in the coil carrier fixture top plate 76 allows for a copper endplate method of electrically coupling the machine poles to provide a damper winding during startup.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A coil carrier fixture for mounting an annular field coil, said fixture comprising:
   (a) a base having a continuous tubular wall with opposite upper and lower ends, a lower annular flange connected to, extending about and projecting outwardly from said lower end of said tubular wall, and an upper end wall extending across said tubular wall and connected to said upper end of said tubular wall;
   (b) a lid separate from said base, said lid having an inner central portion disposable in substantially flush engaging relation with said upper end of said tubular wall and said upper end wall of said base for detachable attachment of said lid to said upper end wall of said base, said lid also having an outer peripheral portion defining an upper annular flange extending about and projecting outwardly from said upper end of said tubular wall of said base and spaced above said lower annular flange thereof when the lid is attached on the base; and
   (c) means for detachably attaching said lid central portion to said upper end wall of said base;
   (d) said tubular wall and lower annular flange of said base and said upper annular flange of said lid defining an external cavity in which the annular field coil can be confined about the exterior of said tubular wall of said base and between said lower and upper annular flanges of said respective base and lid and into and from which the field coil can be inserted and removed by detachment of said lid from said base.

2. The fixture as recited in claim 1, wherein said detachably attaching means is a plurality of fasteners.

3. The fixture as recited in claim 1, wherein said upper end wall is a flat plate disposed within and extending across said open upper end of said tubular wall, said plate being connected to an upper edge of said tubular wall such that the annular field coil can be inserted downwardly past said upper plate and over said tubular wall into a mounted position wherein the field coil surrounds an exterior surface of said tubular wall and rests upon said lower annular flange.

4. The fixture as recited in claim 1, wherein said lid is a flat plate.

5. The fixture as recited in claim 1, wherein said base and lid are composed of an electrically conductive material.

6. A field coil carrier assembly, comprising:
   (a) an annular wire wound electrical field coil; and
   (b) a coil carrier fixture including
      (i) a base having a continuous tubular wall with opposite upper and lower ends, a lower annular flange connected to, extending about and projecting outwardly from said lower end of said tubular wall, and an upper end wall extending across said tubular wall and connected to said upper end of said tubular wall,
      (ii) a lid separate from said base, said lid having an inner central portion disposed in substantially flush engaging relation with said upper end of said tubular wall and said upper end wall of said base, said lid also having an outer peripheral portion defining an upper annular flange extending about and projecting outwardly from said upper end of said tubular wall of said base and spaced above said lower annular flange thereof, and
      (iii) means for detachably attaching said lid central portion to said upper end wall of said base,
      (iv) said tubular wall and lower annular flange of said base and said upper annular flange of said lid defining an external cavity, said annular field coil being confined about the exterior of said tubular wall of said base and between said lower and upper annular flanges of said respective base and lid.

7. The assembly as recited in claim 6, further comprising:
   a resin material impregnating said field coil and said carrier fixture so as to secure said field coil thereto.

8. The assembly as recited in claim 6, wherein said detachably attaching means is a plurality of fasteners.

9. The assembly as recited in claim 6, wherein said upper end wall is a flat plate disposed within and extending across said open upper end of said tubular wall, said plate being connected to an upper edge of said tubular wall such that the annular field coil can be inserted downwardly past said upper plate and over said tubular wall into a mounted position wherein the field coil surrounds an exterior surface of said tubular wall and rests upon said lower annular flange.

10. The assembly as recited in claim 6, wherein said lid is a flat plate.

11. The assembly as recited in claim 6, wherein said base and lid are composed of an electrically conductive material.

12. In a dynamoelectric machine including at least one rotor with a pole body spider having an outer projection and a pole head fastened to said projection, a field coil carrier assembly comprising:
 (a) an annular electrical field coil;
 (b) a metal coil carrier fixture including
  (i) a base having a continuous tubular wall with opposite upper and lower ends, a lower annular flange connected to, extending about and projecting outwardly from said lower end of said tubular wall, and an upper end wall extending across said tubular wall and connected to said upper end of said tubular wall, said upper end wall resting upon said outer projection of said pole body spider and supporting said tubular wall in surrounding relation about said outer projection,
  (ii) a lid separate from said base, said lid having an inner central portion disposed in substantially flush engaging relation with said upper end of said tubular wall and said upper end wall of said base so as to underlie said pole head such that said upper base wall and central lid portion are sandwiched between said fastened together pole head and pole body spider outer projection, said lid also having an outer peripheral portion defining an upper annular flange extending about and projecting outwardly from said upper end of said tubular wall of said base and spaced above said lower annular flange thereof, and
  (iii) means for detachably attaching said lid central portion to said upper end wall of said base,
  (iv) said tubular wall and lower annular flange of said base and said upper annular flange of said lid defining an external cavity, said annular field coil being confined about the exterior of said tubular wall of said base and between said lower and upper annular flanges of said respective base and lid.

13. The machine as recited in claim 12, further comprising:
 a resin material impregnating said field coil and said carrier fixture so as to secure said field coil thereon.

14. The machine as recited in claim 12, wherein said detachably attaching means is a plurality of fasteners.

15. The machine as recited in claim 12, wherein said upper base wall and central lid portion and said pole head and ple body spider are composed of the same electrically conductive material.

16. The machine as recited in claim 12, wherein said tubular wall of said base is supported in outwardly spaced surrounding relation about said pole body spider outer projection so as to define an air gap therebetween.

* * * * *